United States Patent [19]

Lazet

[11] 4,122,154

[45] Oct. 24, 1978

[54] TREATMENT OF ALKALI RICH SILICATE GLASS BATCH

[75] Inventor: Frank J. Lazet, Media, Pa.

[73] Assignee: PQ Corporation, Valley Forge, Pa.

[21] Appl. No.: 834,950

[22] Filed: Sep. 20, 1977

[51] Int. Cl.² .................................................. C01B 33/32
[52] U.S. Cl. ....................................... 423/334; 264/117
[58] Field of Search .......................... 423/334; 106/52; 68/17–18; 264/117

[56] References Cited

U.S. PATENT DOCUMENTS

| 2,644,742 | 7/1953 | Danison | 423/334 |
| 3,065,090 | 11/1962 | Hopkins | 106/52 |
| 3,228,891 | 1/1966 | Duke | 264/117 |
| 3,542,534 | 11/1970 | Yamamoto | 106/52 X |
| 3,868,227 | 2/1975 | Gericke et al. | 264/117 |

FOREIGN PATENT DOCUMENTS 745,666  1/1966  Canada ..................................... 106/42

Primary Examiner—Edward J. Meros
Attorney, Agent, or Firm—Ernest G. Posner; Fred C. Philpitt; J. S. Stephen Bobb

[57] ABSTRACT

The alkali rich raw material batch required to produce soluble alkali metal silicate glass is effectively agglomerated by contacting a concentrated alkali metal silicate solution with the agitating raw materials. Hard agglomerates that are free-flowing, storable and provide important process advantages are formed.

4 Claims, No Drawings

TREATMENT OF ALKALI RICH SILICATE GLASS BATCH

BACKGROUND OF THE INVENTION

This invention is concerned with the preparation of glass by the fusion of a number of particulate raw materials. It is directed to the use of concentrated alkali metal silicate solutions to form hardened agglomerate with the highly alkaline batch used to prepare soluble alkali metal silicate glass.

Silicate glasses and in particular soluble silicate glasses, are prepared by fusion of sand with a source of alkali metal, generally sodium carbonate. Sand and sodium carbonate are available as fine particulate material which must be conveyed, blended and fed to the furnace in which the fusion is carried out. The fine particle content and other physical properties of these materials lead to problems during the handling and fusion steps. These problems include dusting, segregating or demixing, loss of raw materials and air pollution. These problems persist into the furnace resulting in an inhomogeneous product, attack on the refractories and air pollution, among other problems. The finely divided nature of the batch also contributes to less efficient heat transfer to the batch.

It has long been recognized that some method of pelletizing, briquetting or agglomerating after complete and intimate mixing of the batch would be desirable. The batch required for preparing insoluble glass contains a relatively limited amount of alkali and can be moistened with water to form damp agglomerates or to aid in forming pellets or briquettes using pressure. These materials must be dried before storage and/or use as furnace feed thereby requiring extra steps and expense. The more desirable method of simply forming a damp furnace feed requires 2 steps, additional equipment and expense. This method involves adding water (~1% of the batch weight) to the raw materials at the mixing point to prevent dusting, and then adding 2 to 4% additional water just prior to charging the furnace. These methods provide some relief from the aforementioned problems to the insoluble glass industry.

Preparation and use of the alkali rich raw material batch required to produce soluble silicate glass, entails the previously discussed problems, plus the additional complications of a large proportion of sodium carbonate. This large proportion of carbonate renders the use of water to agglomerate the batch as difficult at best. It is necessary to add about 4.5% water or dilute caustic solution to provide the tacky condition required for efficient furnace feed. Additionally, the batch must be maintained above 35° C to retain any benefit, below this temperature sodium carbonate forms higher hydrates and quickly consumes free moisture coating the batch particles. The formation of these higher hydrates introduce a cementing action, movement of the batch is impeded and it is easy to have the entire batch harden into a cohesive mass.

Handling a damp batch of raw materials with a high proportion of alkali poses many problems and requires special handling equipment. It is an object of this invention to provide free-flowing, storable hard agglomerates of soluble glass forming raw materials without the need for a drying step or the use of pressure. It is also an object of this invention to provide a process for preparing such free-flowing agglomerated batches without maintaining an increased temperature after wetting. It is a further object of this invention to provide a one step process whereby the agglomeration takes place during or immediately after the batch mixing step.

SUMMARY OF THE INVENTION

Highly alkaline soluble silicate raw material batches can be formed into hard free-flowing agglomerates or "nugget" by contacting the blending raw materials with concentrated alkali metal silicate solutions. These batch "nuggets" are easily charged to the furnace and the batch does desegregate. In addition, a better heat transfer is also achieved. I have found that alkali metal silicate solutions of more than 30% silicate solids must be used to obtain free-flowing agglomerates without further processing. These "nuggets" are hard, appear dry and are free-flowing in contrast to the characteristics of batches for making insoluble glass that have been dampened with water, sodium hydroxide solution or even dilute silicate solution.

THE INVENTION

The characteristics of the silicate solutions required to form agglomerates or batch "nuggets" are very important. The viscosities of such solutions should increase rapidly when dehydrated slightly to be effective. I have found that silicate solutions containing more than 30% by weight of solids and viscosities of 1.6 poises or more, are useful in forming nuggets of the raw materials. Examples of useful raw materials include:

| Silicate Solution | Wt.Ratio | Total Solids(%) | Viscosity (Poises) |
| --- | --- | --- | --- |
| S 35 ® sodium silicate | 3.75 $SiO_2/Na_2O$ | 32.0 | 2.2 |
| R ® sodium silicate | 3.25 $SiO_2/Na_2O$ | 40.0 | 8.3 |
| N ® sodium silicate | 3.22 $SiO_2/Na_2O$ | 37.5 | 1.8 |
| K ® sodium silicate | 2.88 $SiO_2/Na_2O$ | 42.5 | 9.6 |
| RU ® sodium silicate | 2.40 $SiO_2/Na_2O$ | 47.0 | 21.0 |
| D ® sodium silicate | 2.00 $SiO_2/Na_2O$ | 44.0 | 4.0 |
| KASIL ® #6 potassium | 2.10 $SiO_2/K_2O$ | 38.7 | 10.5 |
| KASIL ® 77 potassium silicate | 1.80 $SiO_2/K_2O$ | 46.0 | 13.0 |

S 35, R, N, K, RU, D and KASIL are registered trademarks of the Philadelphia Quartz Company. I prefer to use silicates with more than 35% total solids in the process of my invention.

The raw batch is prepared by weighing the components, soda ash and sand and then blending them using any convenient method of blending. Twin-shell, paddle or rotary drum blenders can be used, but I prefer to use a turbine mixer in which the particles are entrained in air during mixing. The concentrated silicate solution is dropped onto the agitated raw materials in such a manner that discrete droplettes are formed. Contact between the batch materials and the silicate solution results in an almost immediate formation of fairly regularly shaped spheres.

The "nuggets" formed as a result of this process are hard, free-flowing and feel dry to the touch. Surprisingly, the size of the "nuggets" is never bigger than about ⅛ inch, no matter which processing conditions are used. These agglomerates are easily handled and stored using conventional equipment with the realization of a very large reduction in air pollution. The use of such batch "nuggets" also confers a number of advantages in the fusion furnace. The raw materials cannot now be entrained in the combustion gases, thereby reducing air pollution and attack on certain portions of air processing equipment. There also appears to be increased heat transfer which results in productivity increases of up to approximately 30%. In addition, the resulting glass is more homogeneous and exhibits better properties, generally resulting in solutions of greater clearness containing almost no undissolved glass or unreacted sand.

As indicated previously, the glass making batch for which the use of silicate as an agglomerating agent is necessary, are very rich in soda ash (sodium carbonate). In general, most insoluble or bottle glass batches contain only 20% sodium carbonate. As discussed previously, this low content of carbonate allows the use of water to dampen the batch prior to feeding to the furnace. In contrast, the raw materials for soluble silicate glasses must contain over 30% soda ash and can contain more than 50% ash. I prefer to use the process of my invention on silicate glass batches that contain 30 to 50% sodium carbonate with the remainder being sand. Surprisingly, the raw material batch need only be treated with a very small proportion of the silicate solution to be converted from the fine particulate state to the agglomerated material desired. The silicate solution can constitute 0.2 to 1.5% of the batch, while I prefer to use 0.3 to 1.0% of the weight of the batch as liquid silicate. These percentages of silicate solution correspond to only 0.14 to 1.0% water while the preferred range corresponds to 0.2 to 0.7% water. If less than 0.2% of silicate solution is used, the nuggets will not form. If more than about 1.5% silicate solution is used, the spheres can become cemented together and the desired free-flowing characteristics are lost. In any case, it is economically advantageous to use the smallest amount of silicate solution possible.

EXAMPLES

Certain of the embodiments of my invention are illustrated by the following Examples. The proportions are parts by weight (pbw) or percent by weight (%) unless otherwise stated.

EXAMPLE 1

This Example illustrates the production of soluble sodium silicate glass by the prior art method wherein the raw materials were not agglomerated to form batch nuggets. The raw materials were prepared in 1600 lb. units (1100 lbs. of sand and 500 lbs. of soda ash) using a turbine mixer to blend the materials. The particle sizes for the raw materials and the blend are:

| Particle Size (Microns) | Soda Ash(%) | Sand(%) | Blend(%) |
| --- | --- | --- | --- |
| >833 | — | — | 0.82 |
| >589 | 4.03 | 0.03 | 2.64 |
| >417 | 26.45 | 2.5 | 17.64 |
| >208 | 53.39 | 70.98 | 51.04 |
| <208 | 16.13 | 26.49 | 27.86 |

The blending operation was dusty and an inhomogeneous appearance was found in the blended material. Further blending did not improve the appearance of the batch. The material was fed to a furnace with a crown temperature of 1370° C. After the raw materials had melted and the glass refined, it was drawn from the furnace. White lumps were observed during the draw. Several of these lumps were acquired and found to consist of unreacted sand and glass of very high $SiO_2/Na_2O$ ratio. The glass was dissolved water using pressure and heat. The analysis of the resulting solution is 13.87% $Na_2O$ and 33.26% $SiO_2$ with a $SiO_2/Na_2O$ ratio of 2.40. The turbidity of the silicate solution was 185 ppm as measured on a Coleman nephlometer. The silicate solution was allowed to settle for 2 weeks and the turbidity was 140 ppm. The furnace output for this operation was measured at 24.5 lbs/ft$^2$ hr. and the energy required was 2350 BTU/lb. of glass. The furnace stock was observed during this operation and plume of particulate material could be seen easily.

EXAMPLE 2

This Example illustrates the attempted agglomeration of raw materials for a soluble sodium silicate glass batch using water and dilute caustic (often called "strong water"). Mixtures of sand and soda ash in the same proportions used in Example 1 were prepared and mixed in the turbine mixer. These materials were treated with 1% water, 4.5% water, 2.5% strong water, and 4% strong water. These liquids were sprayed onto the mixing materials using a spray head. The mixtures containing 1% water and 2.5% strong water formed only a few lumps as the water was rapidly adsorbed by the large amount of soda ash. This material was charged to the furnace and the silicate glass formed. White lumps were observed in the glass draw and the turbidity was 188 ppm. The mixtures containing 4.5% water and 4% strong water set to cement hard masses as soon as discharged from the mixer. These materials could not be charged to the furnace.

EXAMPLE 3

This Example illustrates the preparation of soluble silicate glass according to the process of my invention. The 1600 lb. batch of sand and soda ash was mixed in the turbine mixer. Then 6 gal. (69 lbs.) of sodium silicate containing 37.5% solids with a weight ratio of 3.22 $SiO_2/Na_2O$ and a viscosity of 1.8 poises was dropped onto the tumbling material. The batch discharged from the mixer consisted of hard, dense, largely spherical nuggets which were free-flowing and did not cake on storing. The particle size distribution of the agglomerated batch was:

| Particle Size (Microns) | Percent in Size Range |
| --- | --- |
| >1650 | 7.28 |
| >1168 | 0.55 |
| >833 | 0.69 |
| >589 | 2.26 |
| >417 | 13.02 |
| >208 | 60.40 |
| <208 | 15.79 |

This material was fed to the furnace as described in Example 1. The draw was free from white inclusions and the turbidity of the resulting solution was 60 ppm. The furnace output for the operation was 26.3 lbs/ft-hr. and the energy required was 2300 BTU/lb. of glass. The furnace stack was observed and no plume of particulate material was evident.

EXAMPLE 4

The process of Example 3 was repeated, except that 81 and 93 lbs. of the silicate solution was used in the agglomerating step. The particle size distributions for these agglomerated batches were:

| Particle Size (Microns) | Run A 81 lbs.solu. (%) | Run B 93 lbs.solu. (%) |
|---|---|---|
| >1650 | 10.5 | 12.8 |
| >1168 | 1.08 | 1.28 |
| >833 | 0.90 | 1.87 |
| >589 | 3.62 | 5.43 |
| >417 | 17.68 | 20.22 |
| >208 | 52.0 | 42.21 |
| >208 | 14.2 | 16.10 |

These results tend to indicate that larger "nuggets" are formed when a larger proportion of silicate solution is used. These materials were stored for several days before use, and could be handled with no trouble, and provided the same quality glass as indicated in Example 3 requiring about the same energy commitment.

I claim:

1. In the process of preparing silicate glasses by feeding agglomerated glass-forming materials including sand and soda ash (sodium carbonate) to a furnace wherein the materials are melted thereby forming molten glass which is then drawn from the furnace, the improvement comprising:

(a) preparing a raw material batch of sand and soda ash, said batch containing more than 30% soda ash;
 (b) agitating said batch, thereby blending it;
 (c) contacting the agitating batch with 0.2 to 1.5% of the weight of the batch of sodium silicate solution containing more than 30% total solids and a viscosity of 1.6 poises or more, thereby immediately forming hard, free-flowing, agglomerates; and
 (d) feeding said agglomerates to the furnace.

2. The process of claim 1 wherein the sodium silicate solution contain more than 35% total solids by weight.

3. The process of claim 1 wherein the raw material batch contains about 20 to 50% soda ash.

4. The process of claim 1 wherein the sodium silicate constitutes 0.3 to 1% of the weight of the batch.

* * * * *